United States Patent [19]

Tanaka

[11] Patent Number: 4,800,500

[45] Date of Patent: Jan. 24, 1989

[54] METHOD OF DETECTING CYLINDER PRESSURE IN INTERNAL COMBUSTION ENGINE

[75] Inventor: Akira Tanaka, Wako, Japan

[73] Assignee: Honda Giken Kogyo Kabushiki Kaisha, Tokyo, Japan

[21] Appl. No.: 936,858

[22] Filed: Dec. 2, 1986

[30] Foreign Application Priority Data

Dec. 2, 1985 [JP] Japan .................................. 60-271124

[51] Int. Cl.$^4$ ..................... G01M 15/00; G01L 23/22
[52] U.S. Cl. ........................ 364/431.08; 364/431.04;
123/425; 123/435; 73/35; 73/115
[58] Field of Search ...................... 364/431.08, 431.04;
123/425, 435; 73/35, 115

[56] References Cited

U.S. PATENT DOCUMENTS

| | | | |
|---|---|---|---|
| 4,131,097 | 12/1978 | Sawada et al. | 123/425 |
| 4,236,491 | 12/1980 | Hattori et al. | 123/425 |
| 4,397,285 | 8/1983 | O'Neill | 123/425 X |
| 4,403,505 | 9/1983 | Hattori et al. | 73/115 X |
| 4,706,733 | 8/1988 | Tanaka | 73/35 |
| 4,716,759 | 1/1988 | Tanaka | 73/115 |
| 4,718,382 | 1/1988 | Tanaka | 123/425 |
| 4,739,649 | 4/1988 | Tanaka | 73/115 |
| 4,744,243 | 5/1988 | Tanaka | 73/115 |
| 4,744,244 | 5/1988 | Tanaka | 73/115 |

Primary Examiner—Felix D. Gruber
Assistant Examiner—V. N. Trans
Attorney, Agent, or Firm—Armstrong, Nikaido, Marmelstein & Kubovcik

[57] ABSTRACT

The maximum cylinder pressure angle in an internal combustion engine is approximated by inputting the output of a cylinder pressure sensor to a window comparator, comparing the sensor output with predetermined reference values, determining intersection points of the sensor output with the reference values from the pulses output by the comparator, determining the time lapse between a predetermined reference point such as piston TDC and the intersection points, calculating the midpoints between the respective intersection point pairs, extending the line connecting the midpoints, determining the arc tangent of the extension as an indicator of the slope thereof, determining the product of the arc tangent and a separately determined maximum cylinder pressure and using this product to determine the total time lapse from the predetermined reference point up to the intersection of the extension with the sensor output, multiplying this total time by a time/angle conversion factor, and defining the so-obtained angle as the approximate maximum cylinder pressure angle.

8 Claims, 6 Drawing Sheets

METHOD OF DETECTING CYLINDER PRESSURE IN INTERNAL COMBUSTION ENGINE

BACKGROUND OF THE INVENTION

1. Field of the Invention

This invention relates to a method of detecting cylinder pressure in internal combustion engines and more particularly to a method of detecting cylinder pressure wherein the crankshaft angle at which the maximum pressure occurs is detected through approximation.

2. Description of the Prior Art

Recent years have been increasing adoption of internal combustion ignition timing control methods in which the maximum cylinder pressures (Pmax) in the respective power strokes are detected and the ignition timing is controlled so that the maximum cylinder pressure angles $\theta$pmax, i.e. the crankshaft angles at which Pmax occurs, converge toward a predetermined crankshaft angle. A conventional method used for this purpose is disclosed in Japanese Patent Publication No. 58(1983)-33394. In this prior art method, the output of a pressure sensor is differentiated using a differentiation circuit and the result of the differentiation is applied to a comparison circuit for comparison with a predetermined value. However, as this method relies on analog circuitry for the detection, it is not totally satisfactory with regard to accuracy or with regard to tracking performance during a high-speed engine operation. Another method of this type, described in Japanese Unexamined Patent Publication No. 57(1982)-173565, relates to a method of using an A/D converter to A/D convert the output of a cylinder pressure sensor once per prescribed angle of crankshaft rotation and defining the crankshaft angle at the time the converted value reaches a maximum as the maximum cylinder pressure angle $\theta$pmax. In order to realize good detection accuracy with this second prior art method, however, it has been necessary to obtain a large number of pressure value samples and this has required use of high-speed A/D conversion. Thus for practical application of the method it has been necessary to use a high-speed A/D converter and a large capacity memory. This method is therefore disadvantageous in that it requires expensive equipment to carry out.

SUMMARY OF THE INVENTION

The object of the invention is to provide a method of detecting cylinder pressure, in internal combustion engines, which is free of the above-mentioned defects of the prior art methods, which ensures excellent detection accuracy as well as excellent tracking performance during high-speed engine operation, and which can be implemented using a relatively low-speed A/C converter and a relatively low-capacity memory.

The present invention accomplishes this object by providing a method of detecting cylinder pressure in an internal combustion engine comprising the steps of comparing the output of a cylinder pressure sensor with first and second reference values, ref 1 and ref 2, determining the periods of time tp1, tp2, tp3 and tp4 required for the sensor output to pass from a predetermined point to points p1, p2, p3 and p4 intersecting with the references values ref 1 and ref 2, determining midpoint values tp5 and tp6 between the respective intersection point pairs, determining the maximum cylinder pressure Pmax, multiplying the difference between the maximum cylinder pressure Pmax and one of the reference values (Pmax−ref 1 or Pmax−ref 2) by a slope factor $\alpha$ to obtain an offset value $\Delta t$, adding the offset value $\Delta t$ and the midpoint value tp5 or tp6 to obtain a total time tpmax, multiplying the total time tpmax by a time/angle conversion factor k, and defining the product of the multiplication as the maximum cylinder pressure angle $\theta$pmax. The slope factor $\alpha$ is obtained by dividing the difference between the midpoint values tp5 and tp6 by the difference between the reference values (ref 1−ref 2), while the time/angle conversion factor k is obtained as the product of the number of rotations of the engine per second and a crankshaft angle of 360°.

BRIEF DESCRIPTION OF THE DRAWINGS

These and other objects and advantages of the present invention will be more apparent from the following description and drawings in which.

DESCRIPTION OF THE REFERRED EMBODIMENTS

Embodiments of the invention will now be explained with reference to the drawings.

Figure 1:
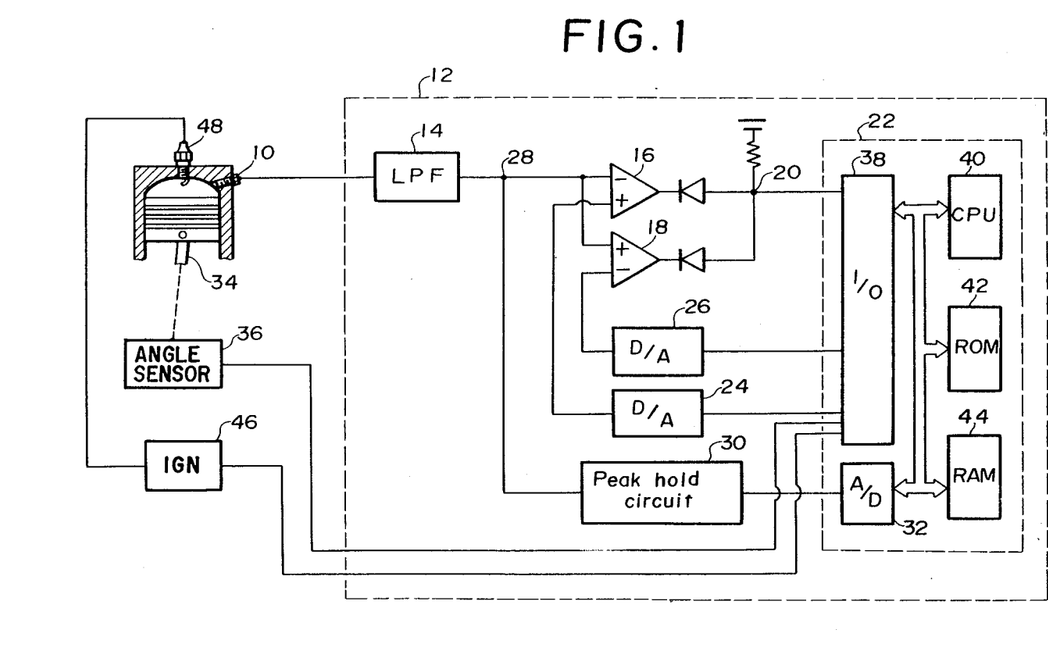
FIG. 1 is a block diagram of a device for carrying out the method of detecting cylinder pressure according to the present invention.

To facilitate understanding of the invention, the method of detecting cylinder pressure according to the invention will first be described with reference to the device for carrying it out shown in FIG. 1.

In the figure, the reference numeral 10 denotes a piezoelectric pressure sensor disposed so as to face into a combustion chamber of an internal combustion engine. The output of the pressure sensor 10 is applied to a charge amplifier (not shown) for charge-voltage conversion and, after being adjusted to an appropriate pulse width, is sent to a control unit 12, where it is first passed through a low pass filter 14 for elimination of high frequency components therefrom. The output from the low pass filter 14 is input to the inverting input terminal of a first comparator 16 and the noninverting input terminal of a second comparator 18. The first and second comparators together constitute a window comparator. The outputs of the first and second comparators are sent to a microcomputer 22 via a connection point 20. On the other hand, the microcomputer 22 outputs two reference values, ref 1 and ref 2, which are sent to a first D/A converter 24 and a second D/A converter 26, respectively, for conversion into analog form. Ref 1 is then forwarded to the noninverting input terminal of the first comparator 16 and ref 2 is forwarded to the inverting terminal of the second comparator 18.

The output of the low pass filter 14 is also sent via a connection point 28 to a peak hold circuit 30. The output of the peak hold circuit 30 is sent to the microcomputer 22 where it is converted into digital form by an A/D converter 32. The peak hold circuit 30 is periodically reset by the microcomputer via a reset line (not shown).

Further, a crankshaft angle sensor 36 for detecting the crankshaft angle of a crankshaft (not shown) to which a piston 34 is connected is provided at an appropriate location as, for example, within a distributor (not shown) associated with the engine. The sensor 36 produces a cylinder identification signal for each cylinder once every 720° of rotation of the crankshaft, a top-dead-center (TDC) signal once every time a piston of the engine reached TDAC, and a unit angle signal once every 30° rotation thereof. The sensor 36 forwards these signals to the microcomputer 22 via an I/O board 38.

The microcomputer has a central processing unit (CPU) 40, a read-only memory (ROM) 42 and a random access memory (RAM) 44. The CPU 40 computes the maximum cylinder pressure angle from the outputs of the window comparator etc. in a manner that will be described later. Based on the output of the crankshaft angle sensor 36, the CPU 40 also uses the ROM 42 and the RAM 44 to compute the ignition timing so that the maximum pressure angle will consistently fall in the vicinity of 15° to 20° after top dead center (ATDC) and outputs commands to ignited the air and fuel mixture within the cylinder combustion chamber via an ignitor 46, the distributor (not shown) and spark plugs 48 (only one shown).

Figure 2:
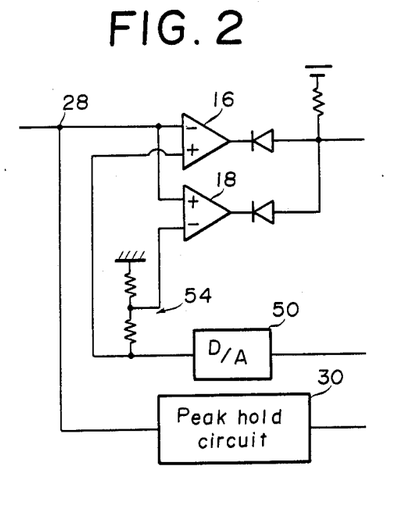
FIG. 2 is a block diagram of an essential part of another device for carrying out the method of detecting cylinder pressure according to the present invention.

FIG. 2 shows an alternative device arrangement in which only a single D/A converter 50 is used. The output terminal of the D/A converter 50 is connected with the noninverting input terminal of the first comparator 16 and also with a voltage dividing circuit 54 branched off from a connection point 52. The divided voltage is applied to the inverting input terminal of the second comparator 18. With this arrangement, the difference between ref 1 input to the first comparator 16 and ref 2 input to the second comparator 18 remains constant, and it is possible to realize a simple circuit structure.

Figures 3, 7:
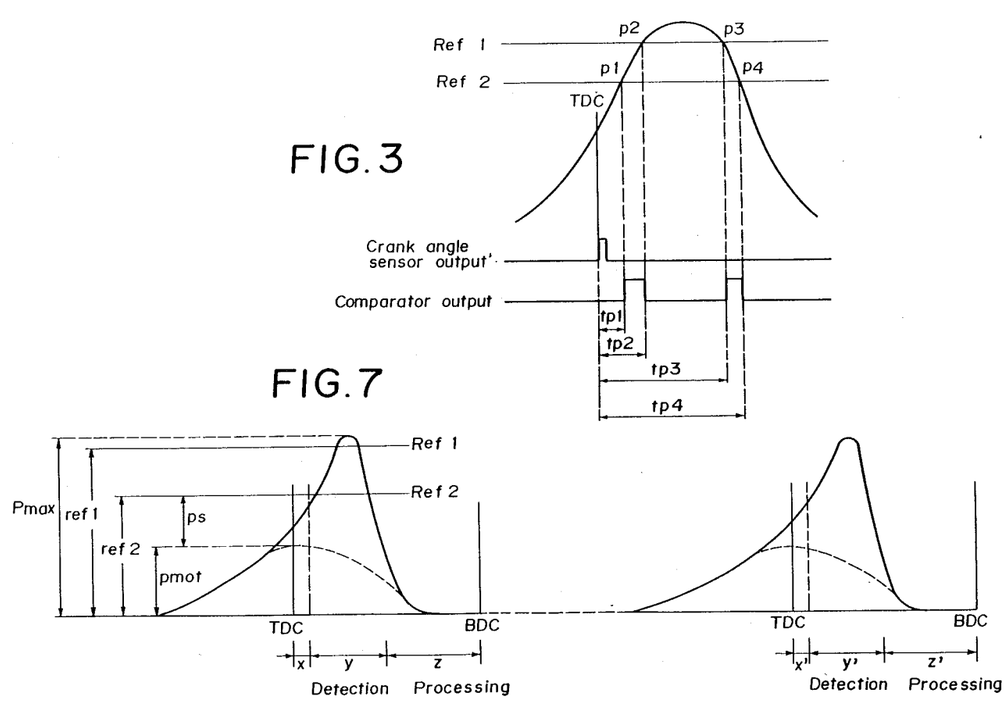
FIG. 3 is a diagram for explaining the operation of the devices shown in FIGS. 1 and 2.
FIG. 7 shows diagrams indicating the time relationships involved in the detection operation.

The operation of the devices shown in FIGS. 1 and 2 will now be explained. When the cylinder pressure value represented by the output of the pressure sensor 10 and the reference values output by the microcomputer 22 are applied to the window comparator consisting of the first and second comparators 16, 18, the output of the window comparator becomes as shown in FIG. 3, which is well known in the art. As the output of the window comparator is input to the microcomputer 22, the microcomputer 22 can, from the leading and trailing edges of the pulses output by the window comparator, determine the points p1 ... p4 at which the value output by the pressure sensor 10 intersects (coincides) with the reference values ref 1 and ref 2. Therefore, by counting the clock pulses of a clock (not shown) built into the computer 22, the CPU 40 is able to measure the time lapse from a predetermined reference point, such as that at which the crankshaft angle sensor 36 outputs a TDC signal, to each of the points p1 ... p4. These time periods are defined as tp1 ... tp4. Further, the peak hold circuit 30 outputs the maximum cylinder pressure Pmax received from the pressure sensor 10 to the CPU 40 via the A/D converter 32 so that, as will be described later, the CPU is able to use this data to compute the time period up to the point of occurrence of maximum cylinder pressure, carry out time/angle conversion to convert the computed time period into a final total time tpmax, and define the converted value as approximating the maximum cylinder pressure angle θpmax. Here it should be noted that while in the aforesaid devices, the maximum cylinder pressure angle θpmax is once calculated in terms of time and then converted to an angular value, the invention is not limited to this and it is alternatively possible, for example, to have the crankshaft angle sensor 36 output unit angle signals once every one or two degrees and to directly obtain the aforesaid tp1, tp2 ... by summing up the unit angles signals.

Figure 4:
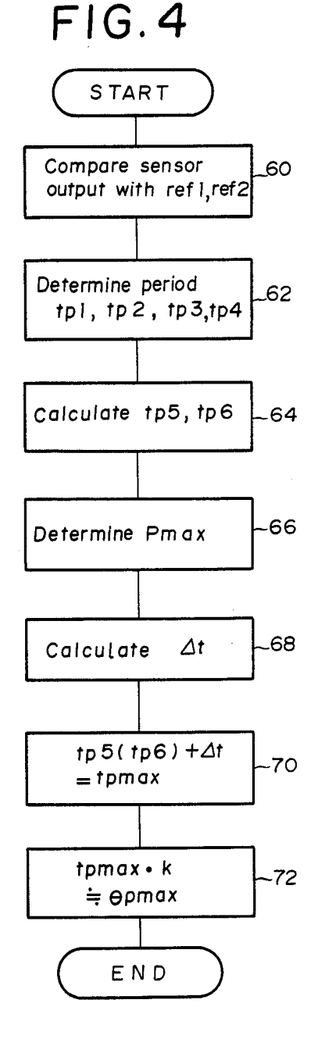
FIG. 4 is a flowchart showing the general idea of the detection method according to the invention.

The general idea of the detection method according to the invention will now be explained with reference to FIG. 4. As shown, the method consists of the steps of comparing the output of a cylinder pressure sensor with first and second reference values, ref 1 and ref 2 (Step 60), determining the periods of time tp1, tp2, tp3 and tp4 required for the sensor output to pass from a predetermined point to points p1, p2, p3 and p4 intersecting with the references values ref 1 and ref 2 (Step 62), determining midpoint values tp5 and tp6 between the respective intersection point pairs (Step 64), determining the maximum cylinder pressure Pmax (Step 66), multiplying the difference between the maximum cylinder pressure Pmax and one of the reference values (Pmax−ref 1 or Pmax−ref 2) by a slope factor α to obtain an offset value Δt (Step 68), adding the offset value Δt and the midpoint value tp5 or tp6 to obtain a total time tpmax (Step 70), multiplying the total time tpmax by a time-/angle conversion factor k (Step 70), and defining the product of the multiplication as the maximum cylinder pressure angle θpmax (Step 72).

Figure 5:
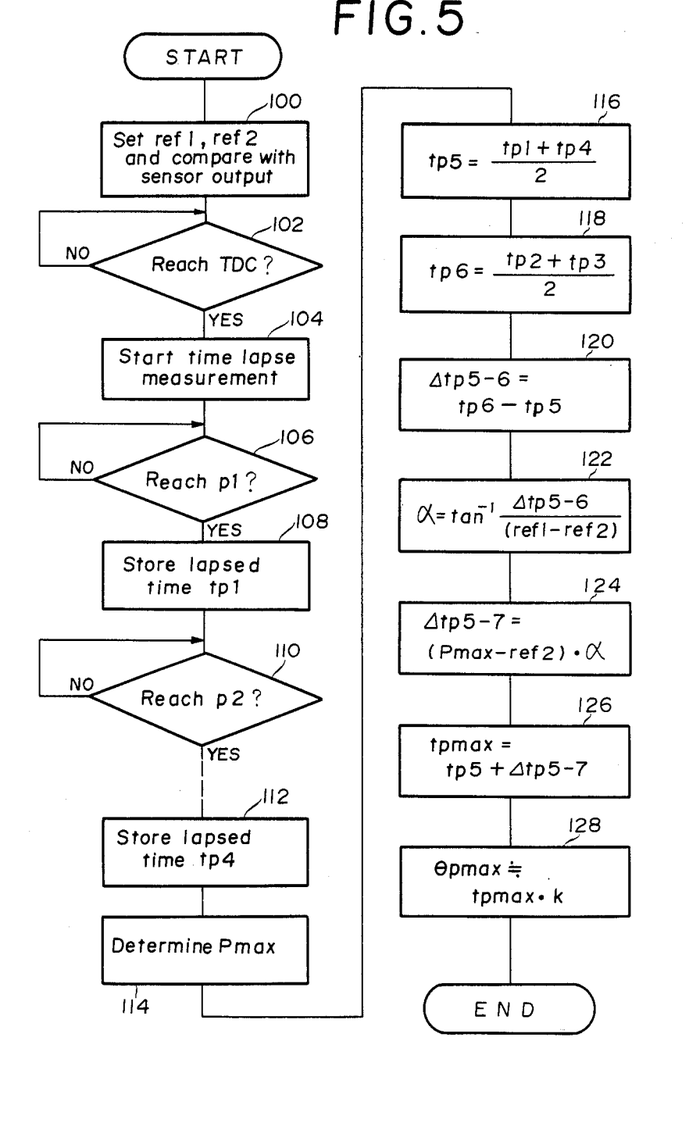
FIG. 5 is a flowchart showing the detection method of the flowchart of FIG. 4 in greater detail.
Figure 6:
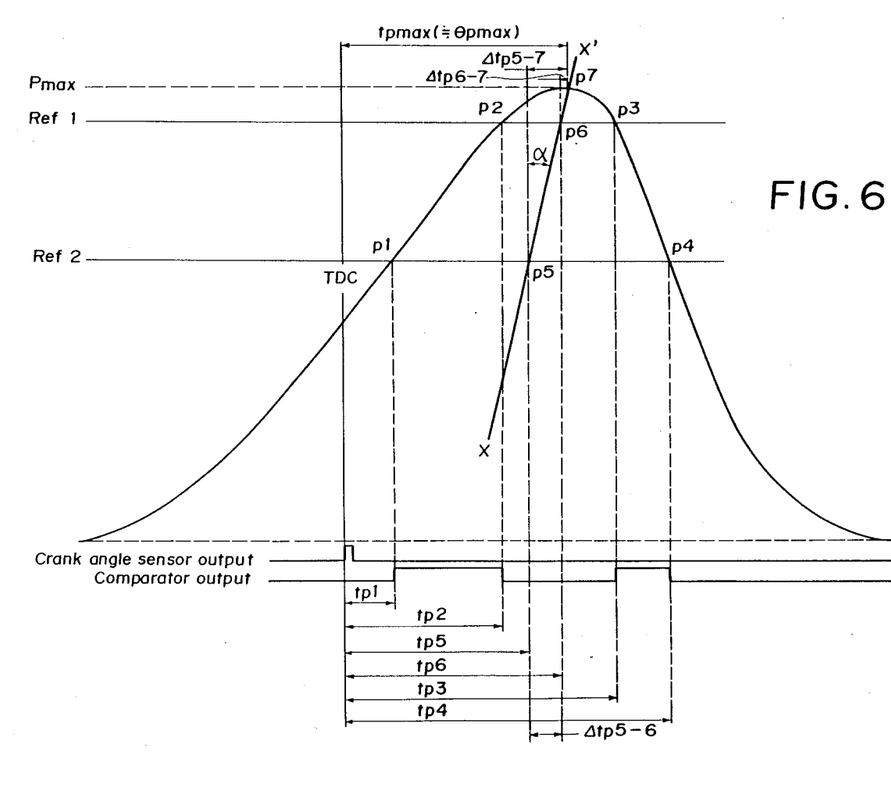
FIG. 6 is a diagram for explaining the detection method shown in FIG. 5.

The method will now be explained in greater detail with reference to the flowchart of FIG. 5 and the explanatory diagram of FIG. 6.

First in Step 100, two references values, namely a first reference value (ref 1) and a second reference value (ref 2), are set on the basis of the value of the maximum cylinder pressure Pmax detected one cycle earlier. (In the first detection cycle, appropriate initial values are set.) As the maximum cylinder pressure may change abruptly, to be on the safe side, ref 1 is set appropriately lower than the maximum cylinder pressure detected one cycle earlier. On the other hand, as shown in FIG. 7, ref 2 is set at a level higher than the motoring pressure (pmot) which is produced when no combustion occurs, so as not to be affected by the motoring pressure. (When the device illustrated in FIG. 2 is used, the difference between ref 1 and ref 2 is automatically set.)

Next in Step 102, upon confirmation of the arrival of the piston TDC signal, the time of arrival of this signal is used as a reference point from which measurement of time lapse is started in Step 104.

Then when arrival at the point P1 has been confirmed in the following Step 106, the period of lapsed time tp1 up to the point p1 is stored in the RAM 44 in Step 108.

Next, when arrival at the point p2 has been confirmed in Step 110, the period of lapsed time tp2 up to p2 is similarly stored in the RAM 44, whereafter tp3 and tp4 are likewise measured and stored in the RAM 44 by the time Step 112 has been completed.

In the following step 114, the A/D converted value representing the maximum cylinder pressure value for the current cycle is read and then, in Step 116, the sum of tp1 and tp4 is divided by two to obtain the midpoint value tp5, while in the Step 118 the midpoint value tp6 between tp2 and tp3 is similarly calculated. These midpoint values tp5 and tp6 correspond to the value of the point p5 midway between p1 and p4 and the value of the point p6 midway between p2 and p3.

In Step 120, the difference between tp5 and tp6, $\Delta tp5-6$ (=tp6−tp5) is calculted, while in Step 122 this value $\Delta tp5-6$ is divided by the difference between the reference values (ref 1−ref 2) to obtain a slope factor $\alpha$. As will be noted from FIG. 6, this value geometrically corresponds to the arc tangent of a triangle whose hypotenuse is the segment of a line "X—X'" connecting the points p5, p6. Therefore, since points p5, p6 are located on the center line of the waveform, the point at which the segment of the line "X—X'" extending upward from the point p6 intersects with the sensor output waveform can be presumed to approximate the point of maximum cylinder pressure.

Next in Step 124, the difference between the maximum cylinder pressure and the second reference value (Pmax−ref 2) is multiplied by the tangent angle (slope factor) $\alpha$, whereby there is obtained a time lapse value $\Delta tp5-7$ (the offset value $\Delta t$) representing the period of time lapse between the end of the time period tp5 and the point of intersection of the center line X—X' with the sensor output waveform, namely between the end of the time period tp5 and the approximated point of maximum cylinder pressure. Therefore, in the succeeding step 126, by adding tp5 and $\Delta tp5-7$ it is possible to calculate the total time tpmax which lapsed between the point of TDC and the approximated point of maximum cylinder pressure.

In Step 128, tpmax is multiplied by a time/angle conversion factor "k" and the result is defined as the approximate maximum cylinder pressure angle $\theta$pmax. The conversion factor k is obtained as $$k = \frac{\text{rotation no. (rpm)} \times 360 \text{ (degrees)}}{60 \text{ (sec)}}$$

Here it should be noted that while in this embodiment, the calculation is once made in terms of time and conversion is then made to an angular value, it is alternatively possible to determine the points corresponding to p1, p2 . . . by angular values from the beginning.

FIG. 7 shows the time relationships involved in the method of detection according to the invention. More specifically, a period "x" is first allowed to pass so as to avoid influence from the motoring pressure (pmot), whereafter the comparison is carried out during the period "y" and the aforesaid calculations for determining the approximate value $\theta$pmax are carried out during the period "z". Also during the period "z", and before the period "x'" of the next cycle for the same cylinder, the reference values for detection in the next cycle are set. The rotation number (rpm) used for calculating the conversion factor "k" is determined during the period "y" and the adjacent portions of the other periods on the basis of the unit angle signals output by the crankshaft angle sensor 36. Also, in line with what was explained earlier, a predetermined gap "ps" is established between the second reference value ref 2 and the motoring pressure pmot. The magnitude of this gap can, if desired, be determined in relation to the engine rotation number (rpm).

Figure 8:
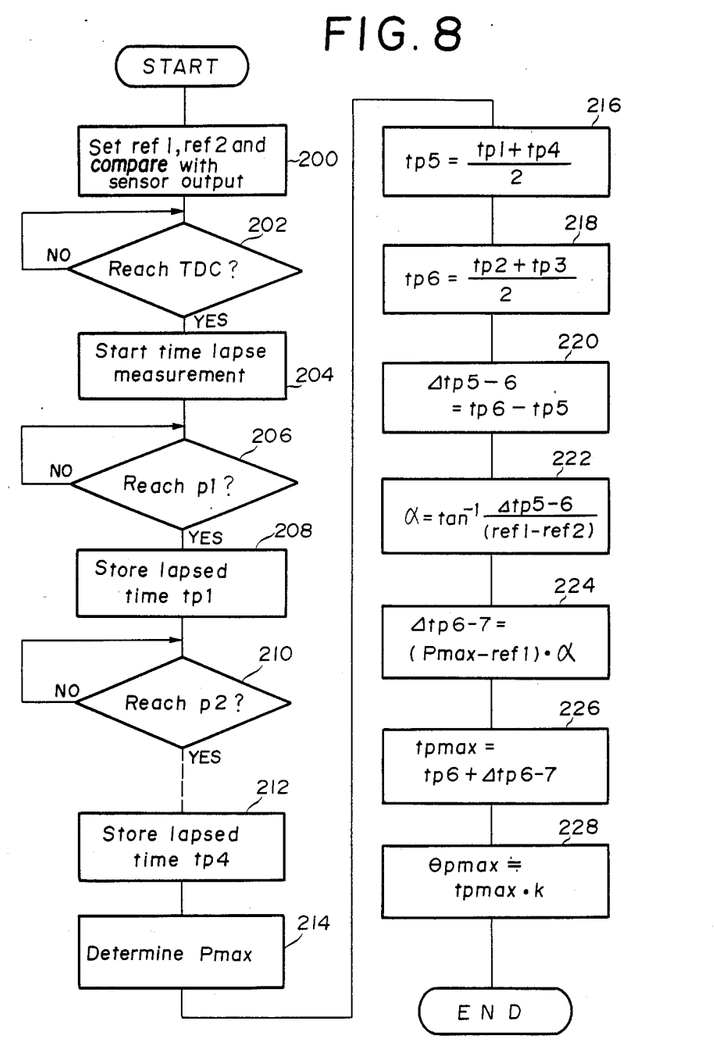
FIG. 8 is a flowchart showing a second embodiment of the method of detecting cylinder pressure according to the invention.

FIG. 8 is a flowchart representing a second embodiment of the detection method of the invention. Referring to the flowchart of FIG. 8, the difference between this embodiment and the first is that following the calculations up to that for the slope factor (Steps 200-222), the offset value $\Delta tp6-7$ is obtained in Step 224 by multiplying the difference between the maximum cylinder pressure Pmax and the first reference value ref 1 by the tangent angle (slope factor) $\alpha$ and total tpmax is then obtained in Step 226 by adding the so-calculated offset value to tp6. The preceding and following steps are the same as those in the first embodiment.

In the present invention, the output of the cylinder pressure sensor is compared with the reference values and the maximum cylinder pressure angle is then derived solely by carrying out arithmetic operations on the result of the comparison and the maximum output value of the cylinder pressure sensor. Therefore, the detection accuracy and the tracking performance during high-speed engine operation are better than can be obtained using analog circuitry. Moreover, as the detection can be accomplished using low-speed A/D conversion, there is no need to use a high-speed A/D converter and this, together with the fact that less memory capacity is required, enables detection of the maximum cylinder pressure with a low-cost device.

While the above description discloses preferred embodiments of the invention, it is to be understood that numerous modifications or alterations may be made without departing from the scope of the invention as set forth in the following claims.

What is claimed is:

1. A method of detecting cylinder pressure angle in an internal combustion engine, comprising the steps of:
    (a) determining first and second reference values such that the first reference value is higher than the second reference value and the first reference value is lower in voltage than a potential largest output signal expected to be output from a cylinder pressure sensor;
    (b) applying said first and second reference values and an output signal from said cylinder pressure sensor to a window comparator;
    (c) measuring distances from a predetermined point to leading and trailing edges of first and second pulses generated from said window comparator, respectively;
    (d) determining a first midpoint of the distance between the leading edge of the first pulse and the trailing edge of the second pulse and determining a second midpoint of the distance between the trailing edge of the first pulse and the leading edge of the second pulse of said window comparator;
    (e) approximating a point of maximum pressure by determining an angle of slope between said first and second midpoints and applying said angle of slope to said pressure output signal to determine a largest value of said pressure sensor, representing a maximum cylinder pressure, of a current cycle;
    (f) calculating a difference between the largest value and one of said first and second reference values;
    (g) calculating an offset value of said approximated point of maximum pressure from one of said first and second midpoint values by multiplying the difference by said angle of slope;
    (h) calculating a total distance between the predetermined point and the approximated point of maximum cylinder pressure by obtaining a sum of the offset value and said one of said midpoints; and (i) using the sum as a position representing a maximum cylinder pressure angle of said internal combustion engine.

2. A method according to claim 1, wherein said distances are measured in time and the sum is converted into an angular value by multiplying by a product of engine speed per second and crank angle of 360 degrees.

3. A method according to claim 2, wherein said angle of slope is obtained by calculating the difference between the midpoints and dividing the difference by the difference between the first and second reference values.

4. A method according to claim 2, wherein the difference calculated at step (f) is the difference between the largest value and the second reference value, and the offset value obtained at step (g) is added to the first midpoint at step (h).

5. A method according to claim 2, wherein the difference calculated at step (f) is the difference between the largest value and the first reference value, and the offset value obtained at step (g) is added to the second midpoint at step (h).

6. A method according to claim 1, wherein the second reference value is set at a level higher than a sensor output signal representing a motor pressure of said engine at which no combustion occurs.

7. A method according to claim 6, wherein the second reference value is constantly maintained a predetermined fixed amount lower than the first reference value.

8. A method according to claim 1 wherein said predetermined point is a top-dead-center point of a piston of said engine.

* * * * *